United States Patent
Haghighat et al.

(10) Patent No.: US 11,991,667 B2
(45) Date of Patent: May 21, 2024

(54) METHODS AND APPARATUS OF MULTI-TRANSMIT/RECEIVE POINT TRANSMISSION

(71) Applicant: INTERDIGITAL PATENT HOLDINGS, INC., Wilmington, DE (US)

(72) Inventors: Afshin Haghighat, Ile-Bizard (CA); Shahrokh Nayeb Nazar, San Diego, CA (US); Moon-il Lee, Melville, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 519 days.

(21) Appl. No.: 17/283,192

(22) PCT Filed: Oct. 9, 2019

(86) PCT No.: PCT/US2019/055381
§ 371 (c)(1),
(2) Date: Apr. 6, 2021

(87) PCT Pub. No.: WO2020/076938
PCT Pub. Date: Apr. 16, 2020

(65) Prior Publication Data
US 2021/0352629 A1 Nov. 11, 2021

Related U.S. Application Data

(60) Provisional application No. 62/743,339, filed on Oct. 9, 2018.

(51) Int. Cl.
*H04W 72/02* (2009.01)
*H04L 1/1867* (2023.01)
(Continued)

(52) U.S. Cl.
CPC .......... *H04W 72/02* (2013.01); *H04L 1/1896* (2013.01); *H04W 72/0446* (2013.01); *H04W 72/21* (2023.01); *H04W 72/23* (2023.01)

(58) Field of Classification Search
CPC ..... H04W 72/02; H04W 72/21; H04W 72/23; H04W 72/0446; H04L 1/1896
(Continued)

(56) References Cited

U.S. PATENT DOCUMENTS 9,363,800 B2 6/2016 She et al.
9,973,297 B2 5/2018 Marinier et al.
(Continued)

FOREIGN PATENT DOCUMENTS

WO 2014/105388 7/2014

OTHER PUBLICATIONS

Huawei et al., "Discussion on the multi-TRP/panel transmission in NR," 3GPP TSG RAN WG1 Meeting #93, R1-1807130, Busan, Korea (May 21-25, 2018).
(Continued)

*Primary Examiner* — Mark G. Pannell
(74) *Attorney, Agent, or Firm* — Volpe Koenig

(57) ABSTRACT

A method of multi-transmit/receive point (multi-TRP) transmission. The method comprises receiving a parameter set and a physical downlink control channel (PDCCH) transmission from each of multiple TRPs; decoding each received PDCCH transmission to obtain a K1 value for each of the multiple TRPs based on each received parameter set; receiving a physical downlink shared channel (PDSCH) transmission from each of the multiple TRPs; determining a PDSCH reception slot location for each received PDSCH transmission; determining, based on each determined PDSCH reception slot location and each obtained K1 value, a candidate PUCCH slot location for each of the multiple
(Continued)

TRPs; and determining a selected PUCCH slot location for the multiple TRPs based on comparison of all of the determined candidate PUCCH slot locations, wherein if all of the determined candidate PUCCH slot locations are not the same, the selected PUCCH slot location is a farthest candidate PUCCH slot location.

14 Claims, 11 Drawing Sheets

(51) Int. Cl.
*H04W 72/0446* (2023.01)
*H04W 72/21* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0241262 | A1* | 8/2014 | Novak | H04W 72/23 370/329 |
| 2015/0036637 | A1 | 2/2015 | Nayeb Nazar et al. | |
| 2015/0319718 | A1 | 11/2015 | Yang et al. | |
| 2017/0332359 | A1 | 11/2017 | Tsai et al. | |
| 2018/0076924 | A1 | 3/2018 | Lee et al. | |
| 2018/0227156 | A1* | 8/2018 | Papasakellariou | H04L 5/0053 |
| 2019/0123879 | A1* | 4/2019 | Wang | H04L 1/1864 |
| 2019/0313386 | A1* | 10/2019 | Hwang | H04W 72/23 |
| 2020/0267597 | A1* | 8/2020 | Huang | H04W 76/14 |
| 2020/0314815 | A1* | 10/2020 | Kim | H04L 1/1864 |
| 2020/0351026 | A1* | 11/2020 | Babaei | H04L 1/1822 |
| 2022/0287048 | A1* | 9/2022 | Lin | H04L 27/2655 |

OTHER PUBLICATIONS

Huawei et al., "Enhancements on multi-TRP/panel transmission in NR," 3GPP TSG RAN WG1 Meeting #94, R1-1809117, Gothenburg, Sweden (Aug. 20-24, 2018).
Huawei et al., "Enhancements on multi-TRP/panel transmission," 3GPP TSG-RAN WG1 Meeting #94bis, R1-1810104, Chengdu, China (Oct. 8-12, 2018).
NTT Docomo, Inc., "Physical Layer Enhancements for NR URLLC," 3GPP TSG RAN WG1 Meeting #94, R1-1809163, Gothenburg, Sweden (Aug. 20-24, 2018).
Qualcomm Incorporated, "Enhancements on Multi-TRP/Panel Transmission," 3GPP TSG-RAN WG1 Meeting #94bis, R1-1811277, Chengdu, China (Oct. 8-12, 2018).
Ericsson, "Multi-TRP Transmission," 3GPP TSG RAN WG1 Meeting #88, R1-1702673, Athens, Greece (Feb. 13-17, 2017).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Interdigital Inc., "On the Performance of Multi-TRP/Panel Transmission," 3GPP TSG RAN WG1 #98, R1-1908232, Prague, Czech Republic (Aug. 26-30, 2019).
NTT Docomo, Inc., "Layer 1 enhancements for NR URLLC," 3GPP TSG RAN WG1 Meeting #94bis, R1-1811378, Chengdu, China (Oct. 8-12, 2018).
Oppo, "Text proposals for HARQ timing," 3GPP TSG RAN WG1 Meeting #94bis, R1-1810983, Chengdu, China (Oct. 8-12, 2018).
Third Generation Partnership Project, "Technical Specification Group Radio Access Network; Evolved Universal Terrestrial Radio Access (E-UTRA); Physical channels and modulation (Release 8)," 3GPP TS 36.211 V2.0.0 (Sep. 2007).
Third Generation Partnership Project, "Technical Specification Group Radio Access Network; Evolved Universal Terrestrial Radio Access (E-UTRA); Physical channels and modulation (Release 15)," 3GPP TS 36.211 V15.3.0 (Sep. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.3.0 (Sep. 2018).
Third Generation Partnership Project, "Technical Specification Group Radio Access Network; Evolved Universal Terrestrial Radio Access (E-UTRA); Physical channels and modulation (Release 15)," 3GPP TS 36.211 V15.7.0 (Sep. 2019).
Third Generation Partnership Project, Technical Specification Group Radio Access Network; Study on New Radio (NR) access technology (Release 15) 3GPP TR 38.912 V15.0.0 (Jun. 2018).
Third Generation Partnership Project, "Technical Specification Group Radio Access Network; Study on New Radio Access Technology (Release 14)," 3GPP TR 38.912 V0.0.2 (Sep. 2016).
Third Generation Partnership Project, "Technical Specification Group Radio Access Network; Evolved Universal Terrestrial Radio Access (E-UTRA); Physical layer procedures (Release 15)," 3GPP TS 36.213 V15.7.0 (Sep. 2019).
Third Generation Partnership Project, "Technical Specification Group Radio Access Network; Evolved Universal Terrestrial Radio Access (E-UTRA); Physical layer procedures (Release 8)," 3GPP TS 36.213 V2.0.0 (Sep. 2007).
"List of RAN1 Agreements," 3GPP tsg_ran\TSG_RAN (Dec. 13, 2017).
NTT Docomo, Inc. (Rapporteur), "RAN WG's progress on NR WI in the Nov. meeting 2017," 3GPP TSG-RAN WG2 NR Ad-hoc 1801, R2-1800217, Vancouver, Canada (Jan. 22-26, 2018).

* cited by examiner

US 11,991,667 B2

METHODS AND APPARATUS OF MULTI-TRANSMIT/RECEIVE POINT TRANSMISSION

CROSS-REFERENCE TO RELATED APPLICATIONS

This application is the U.S. National Stage, under 35 U.S.C. § 371, of International Application No. PCT/US2019/055381 filed Oct. 9, 2019, which claims the benefit of U.S. Provisional Application No. 62/743,339 filed Oct. 9, 2018, the contents of which are incorporated herein by reference.

BACKGROUND

In new radio (NR), multi-TRP (MTRP) operation may be supported. For downlink (DL) NR MTRP, an NR WTRU may be able to receive and process multiple NR-physical downlink control channels (PDCCHs) and multiple NR-physical downlink shared channels (PDSCHs).

In a scenario, a single NR-PDCCH schedules a single NR-PDSCH where separate NR-PDSCH data layers are transmitted from separate TRPs. Despite transmission of multiple NR-PDSCH data layers, the complexity of WTRU blind search for downlink control information(DCI) decoding may be similar to legacy systems since a WTRU has only to decode one NR-PDCCH. However, scheduling decisions may be centrally coordinated at one gNB, requiring some coordination between multiple TRPs that may be optimized over a large network area by one TRP. Also, beam link failure at the primary coordinating TRP may affect transmission at all other TRPs since the WTRU may receive control information from one TRP for all TRPs in the coordinating set.

In another scenario, multiple NR-PDCCHs each schedule a respective NR-PDSCH, and each NR-PDSCH is transmitted from a separate TRP. Per current discussions, NR may support a maximum of two NR-PDSCHs per component carrier for one bandwidth part and a maximum of two NR-PDCCHs corresponding to a single slot. Having multiple NR-PDCCHs may yield more scheduling flexibility at the TRPs. Each NR-PDCCH may carry different scheduling instructions for the WTRU without being affected by the non-ideal backhaul. Therefore, there is less information that may need to be exchanged between cooperating TRPs over the backhaul. Also, a distributed scheduling may provide diversity since beam link failure at one TRP may only affect the resources managed by that TRP. Transmissions at other TRPs may continue without interruption. This may be an important factor for ultra-reliable low-latency(URLLC) applications. On the other hand, since a WTRU may need to perform blind detection on multiple received NR-PDCCHs, the effective size of the search space may increase. Coordination remains an important aspect of operation to prevent collision of transmitted NR-PDCCHs from MTRPs.

SUMMARY

A method of multi-transmit/receive point (multi-TRP) transmission, comprising receiving a parameter set and a physical downlink control channel (PDCCH) transmission from each of a plurality of TRPs; decoding each received PDCCH transmission to obtain a K1 value for each of the plurality of TRPs based on each received parameter set; receiving a physical downlink shared channel (PDSCH) transmission from each of the plurality of TRPs; determining a PDSCH reception slot location for each received PDSCH transmission; determining, based on each determined PDSCH reception slot location and each obtained K1 value, a candidate PUCCH slot location for each of the plurality of TRPs; and determining a selected PUCCH slot location for all of the plurality of TRPs based on comparison of all of the determined candidate PUCCH slot locations, wherein if all of the determined candidate PUCCH slot locations are not the same, the selected PUCCH slot location is a farthest candidate PUCCH slot location.

A wireless transmit/receive unit (WTRU) configured to perform a multi-transmit/receive point (multi-TRP) transmission, comprising: a receiver; and a processor, wherein the receiver is configured to receive a parameter set, a physical downlink control channel (PDCCH) transmission and a physical downlink shared channel (PDSCH) transmission from each of a plurality of TRPs; the processor is configured to decode each received PDCCH transmission to obtain a K1 value for each of the plurality of TRPs based on each received parameter set; determine a PDSCH reception slot location for each received PDSCH transmission; determine, based on each determined PDSCH reception slot location and each obtained K1 value, a candidate PUCCH slot location for each of the plurality of TRPs; and determine a selected PUCCH slot location for all of the plurality of TRPs based on comparison of all of the determined candidate PUCCH slot locations, wherein if all of the determined candidate PUCCH slot locations are not the same, the selected PUCCH slot location is a farthest candidate PUCCH slot location.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
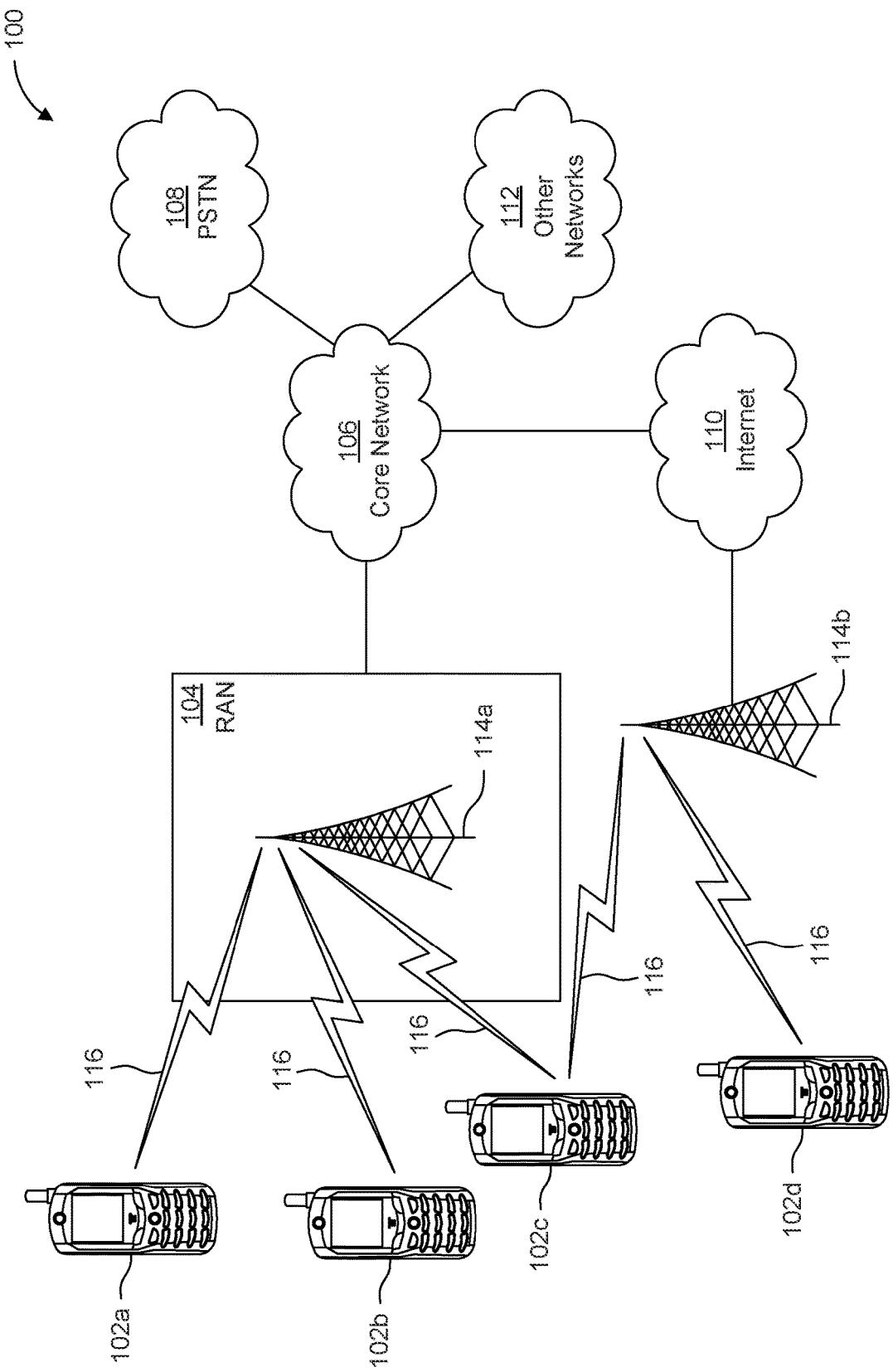
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform SpreadOFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN)104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, anext generation NodeB, such as a gNode B(gNB), a new radio(NR)NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage fora wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN),In yet another embodiment, the base station 114b and the WTRUs 102c, 102d may utilize a cellular-based RAT (e.g., WCDMA, CDMA2000, GSM, LTE, LTE-A,LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
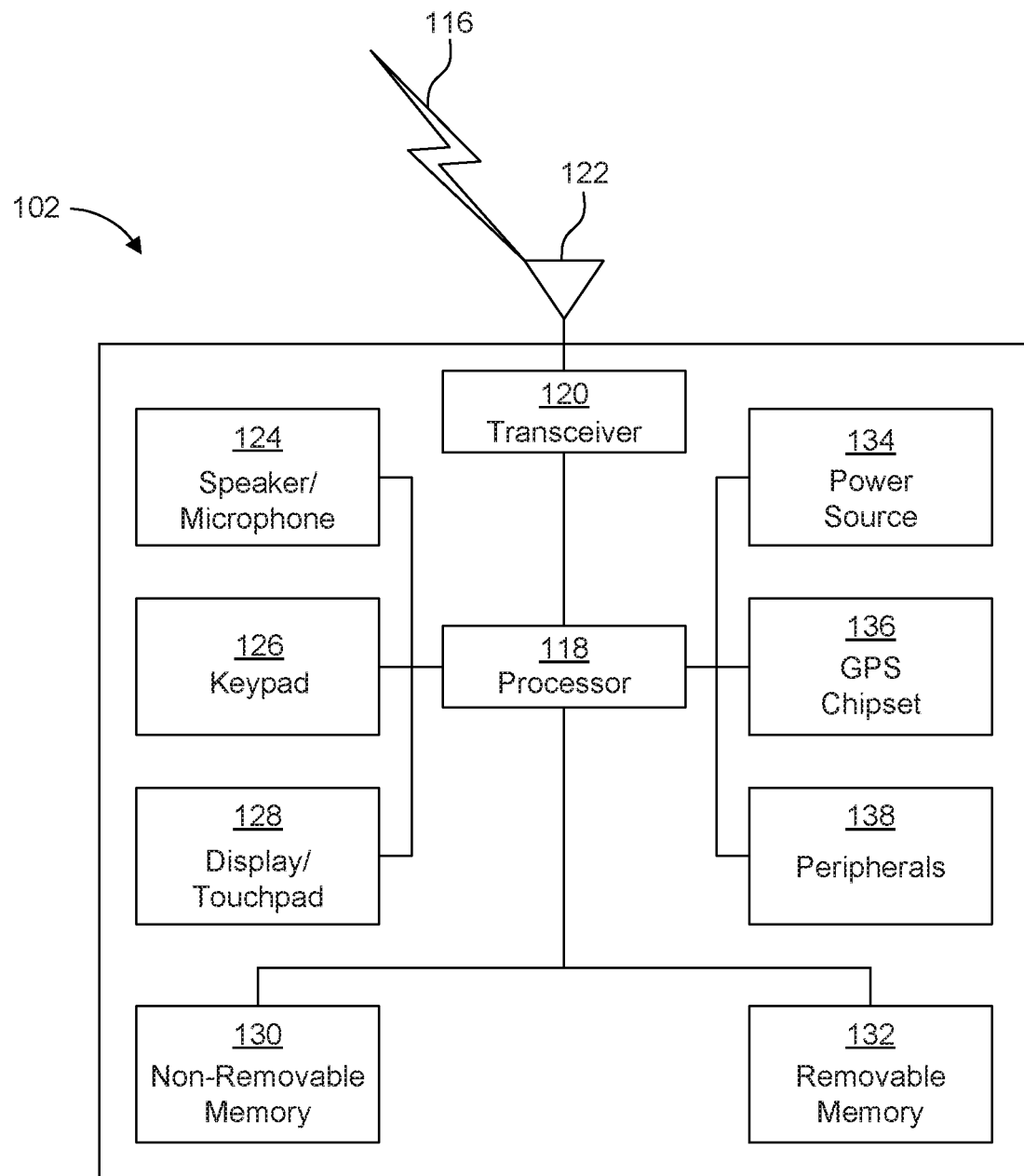
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NRand IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL(e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
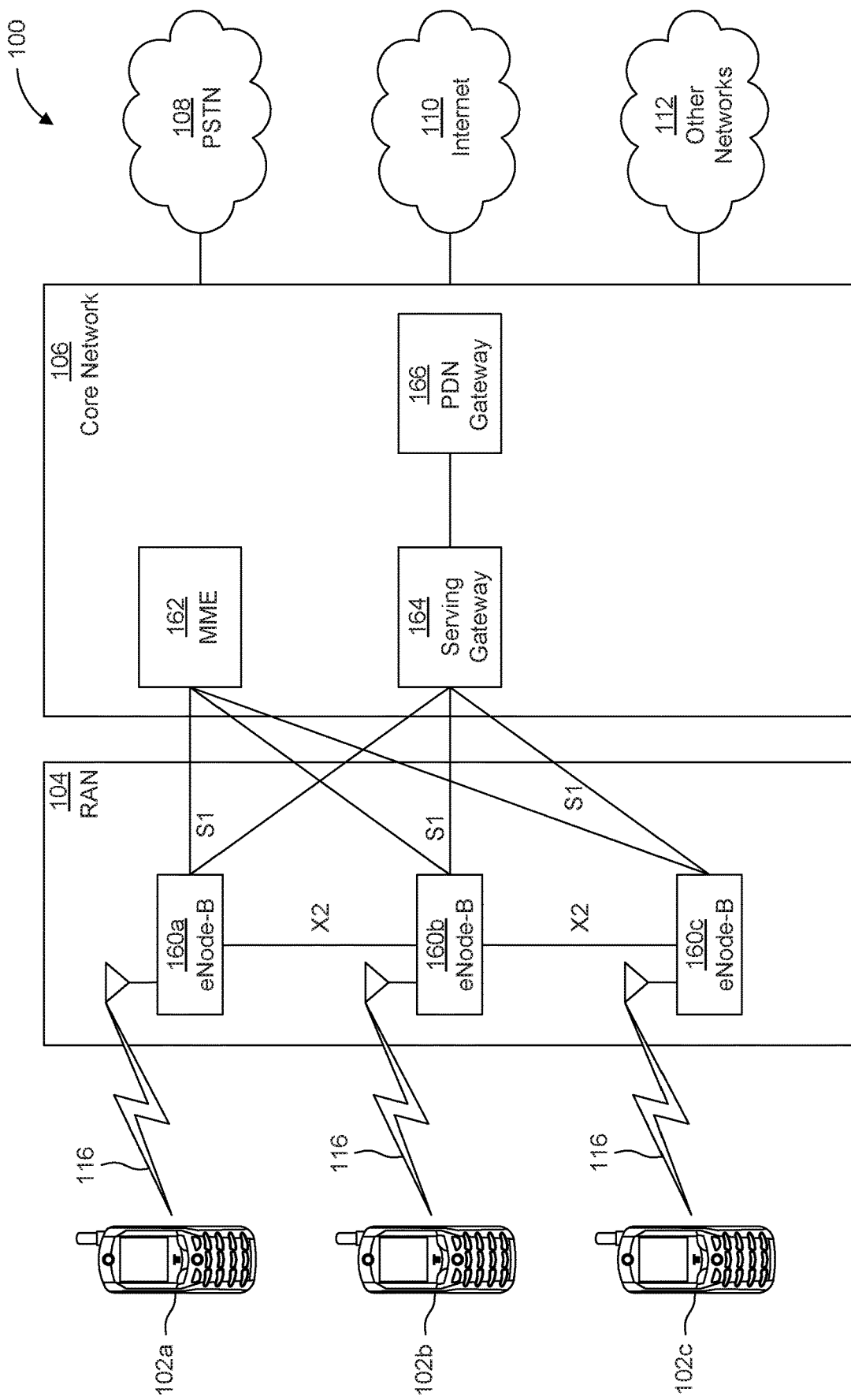
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN106 according to an embodiment. As noted above, the RAN 104 may employ an E-UTRA radio technology to communicate with the WTRUs 102a, 102b, 102c over the air interface 116. The RAN 104 may also be in communication with the CN106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN106 shown in FIG. 1C may include a mobility management entity (MME) 162, a serving gateway (SGW) 164, and a packet data network (PDN) gateway (PGW) 166. While the foregoing elements are depicted as part of the CN106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN106 may facilitate communications with other networks. For example, the CN106 may provide the WTRUs 102a, 102b, 102c with access to circuit-switched networks, such as the PSTN 108, to facilitate communications between the WTRUs 102a, 102b, 102c and traditional land-line communications devices. For example, the CN106 may include, or may communicate with, an IP gateway (e.g., an IP multimedia subsystem (IMS) server) that serves as an interface between the CN106 and the PSTN 108. In addition, the CN106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
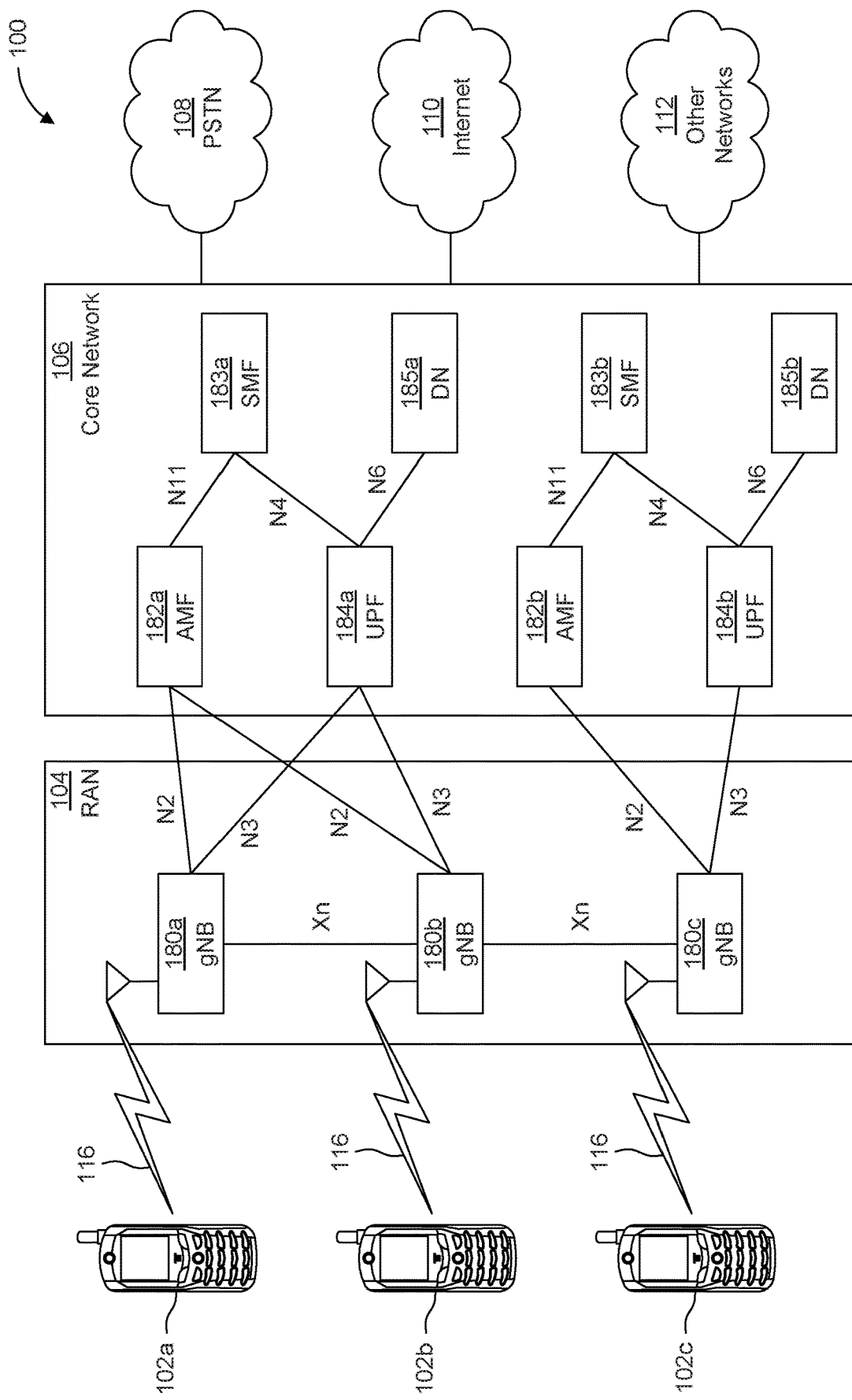
FIG. 1D is a system diagram illustrating a further example RAN and a further example CN that may be used within the communications system illustrated in FIG. 1A according to an embodiment.

FIG. 1D is a system diagram illustrating the RAN 104 and the CN106 according to an embodiment. As noted above, the RAN 104 may employ an NR radio technology to communicate with the WTRUs 102a, 102b, 102c over the air interface 116. The RAN 104 may also be in communication with the CN106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN106 via an N11 interface. The SMF 183a, 183b may also be connected to a UPF 184a, 184b in the CN106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN106 may facilitate communications with other networks. For example, the CN106 may include, or may communicate with, an IP gateway (e.g., an IP multimedia subsystem (IMS) server) that serves as an interface between the CN106 and the PSTN 108. In addition, the CN106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To ensure efficiency and reliability of an Multi-TRP operation, many aspects of NR operation should be considered and addressed. In embodiments described in this application, methods and apparatus of multi transmit/receive point (multi-TRP) transmission are described that may enable a WTRU to manage its NR-PUCCH transmission with respect to multiple NR-PDSCHs from multiple TRPs. Further, in embodiments described in this application, methods and apparatus are described that may enable a WTRU to efficiency determine its state of reception (e.g., Multi-TRP or non-Multi-TRP mode of operation) through relevant procedures to determine and adapt as it may switch between single and multi-TRP transmission modes. Further, in embodiments described in this application, methods and apparatus are described that may enable coordination for Multi-TRP transmissions for both DL demodulation reference signal (DMRS) and uplink (UL) sounding reference signal (SRS) transmissions, for example, to maintain orthogonality and reliability of measurements.

A control resource set (CORESET) may comprise a set of REs used for a downlink control channel and may be configured by its frequency resources, its length in time (in terms of symbols), and the type of its REG bundles. A Search Space (or a set of search spaces) may be a set of PDCCH candidates that are monitored by a WTRU or a group of WTRUs during blind detection of PDCCH.

Figure 2:
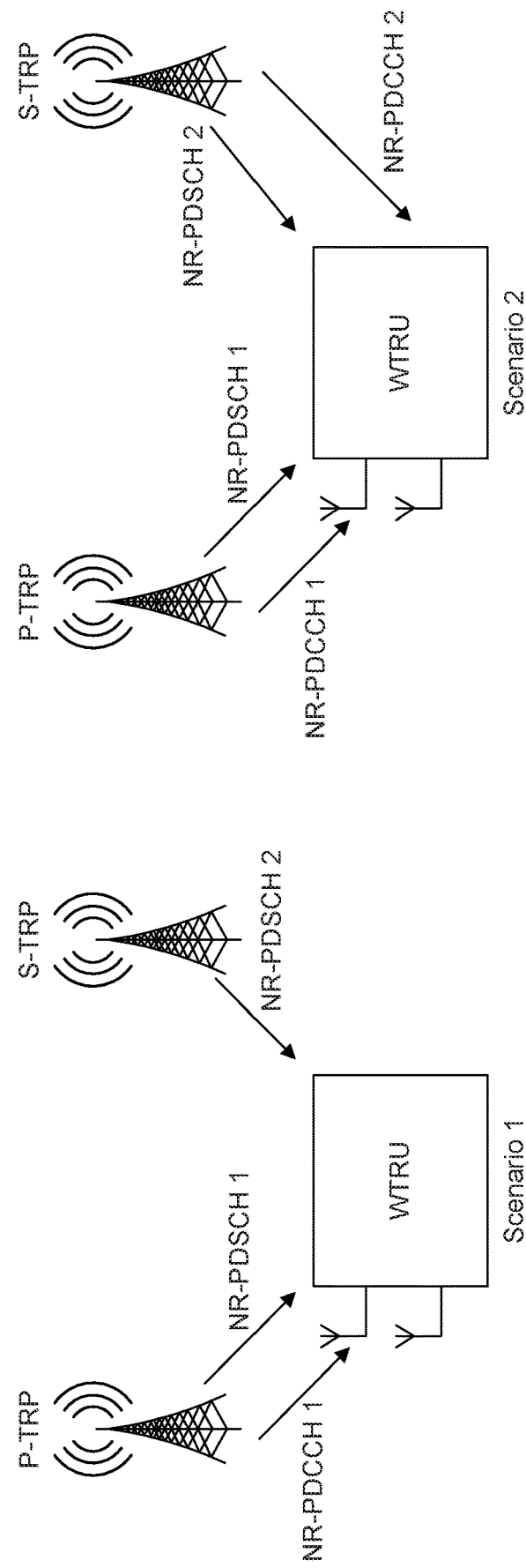
FIG. 2 is a diagram of two potential scenarios for downlink (DL) multi-TRP (MTRP) operations.

FIG. 2 is a diagram illustrating two potential scenarios for downlink multi-TRP operations. In NR, multi-TRP operation is supported with the initial focus on downlink transmission. It is expected that a WTRU would be able to receive and process multiple PDCCH and PDSCH transmissions. FIG. 2 shows two main options of downlink multi-TRP operations where P-TRP refers to the Primary TRP and S-TP refers to the Secondary TRP, respectively. In Scenario 1, a single PDCCH is used to schedule a single PDSCH transmission where separate layers are transmitted from separate TRPs. In Scenario 2, multiple PDCCHs are each used to schedule a respective PDSCH transmission where each PDSCH transmission is transmitted from a separate TRP. While the examples in FIG. 2 shows a number of 2 PDSCHs transmissions per component carrier in the case of one bandwidth part, and a maximum number of 2 PDCCHs corresponding in a single slot, other configurations are possible.

In Scenario 1, despite transmission of multiple PDSCH data layers, the complexity of WTRU blind search for DCI decoding may remain similar to legacy systems since a WTRU has to decode only one PDCCH. However, scheduling decisions may be centrally coordinated at one gNB requiring some coordination between multiple TRPs. Also, beam link failure at the primary coordinating TRP could affect transmission at all other TRPs since the WTRU may receive control information from one TRP for all TRPs in the coordinating set.

In Scenario 2, having multiple PDCCH may yield more scheduling flexibility at the TRPs. Each PDCCH can carry different scheduling instructions for the WTRU without being affected by the non-ideal backhaul. Therefore, there is less information that may need to be exchanged between the cooperating TRPs over the backhaul. Also, a distributed scheduling may be used to provide diversity since beam link failure at one TRP may only affect the resources managed by that TRP, and transmissions at other TRPs can continue without interruption. This may be an important factor for ultra-reliable low latency communication (URLLC) applications. On the other hand, since a WTRU may need to perform blind searching/blind decoding on multiple received PDCCHs, the effective size of a search space may increase. Coordination remains an important aspect of operation to prevent collision of PDCCH transmissions from multi-TRPs.

Figure 3:
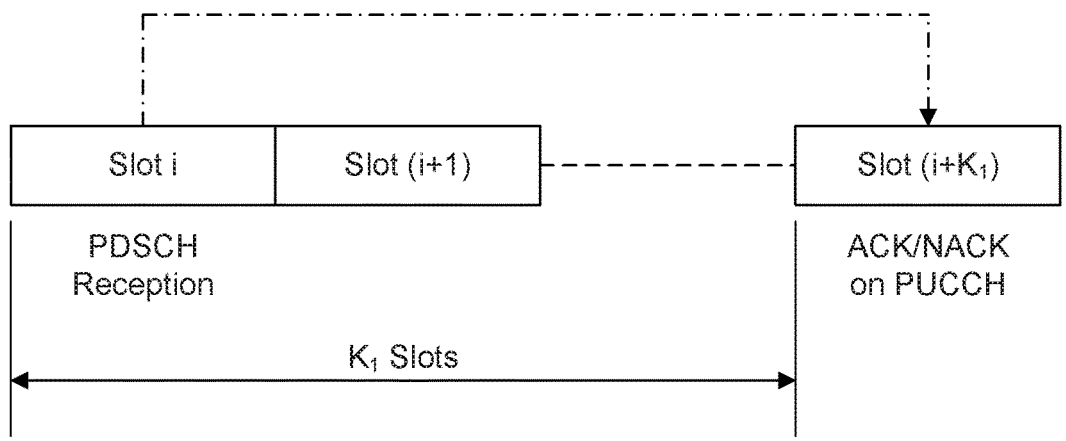
FIG. 3 is a diagram illustrating an asynchronous hybrid automatic repeat request (HARQ) operation in new radio (NR) where the ACK/NACK transmission occurs $K_1$ slots after the physical downlink control channel (PDSCH) decoding.

FIG. 3 is a diagram illustrating an asynchronous Hybrid Automatic Repeat Request (HARQ) operation in NR where an ACK/NACK transmission occurs $K_1$ slots after PDSCH decoding. Once a WTRU decodes a received DCI, for example DCI Format 1_1 or DCI Format 1_0, it may determine various downlink scheduling information including a PDSCH-to-HARQ timing indicator, i.e., $K_1$. $K_1$ may be an index that points to a RRC configured value that defines a time offset between reception of a PDSCH transmission and transmission of PUCCH (e.g., ACK/NACK transmission on PUCCH). As shown in FIG. 3, the WTRU may determine that the ACK/NACK transmission will occur $K_1$ slots after the PDSCH reception. As long as the WTRU decodes the PDCCH, the WTRU may determine that the slot for the PDSCH reception is slot i, and thus the WTRU may further determine that the slot for the ACK/NACK transmission is slot $(i+K_1)$.

Meanwhile, the WTRU may also obtain $K_0$ and $K_2$ after decoding the received DCI. $K_0$ is a time domain resource assignment indicator which indicates a time offset between a DCI and a PDSCH transmission. $K_2$ is a time domain resource assignment which indicates a time offset between a DCI and a PUSCH transmission.

The following embodiments and examples will describe possible application of $K_0$ and $K_1$ in detail.

Figure 4:
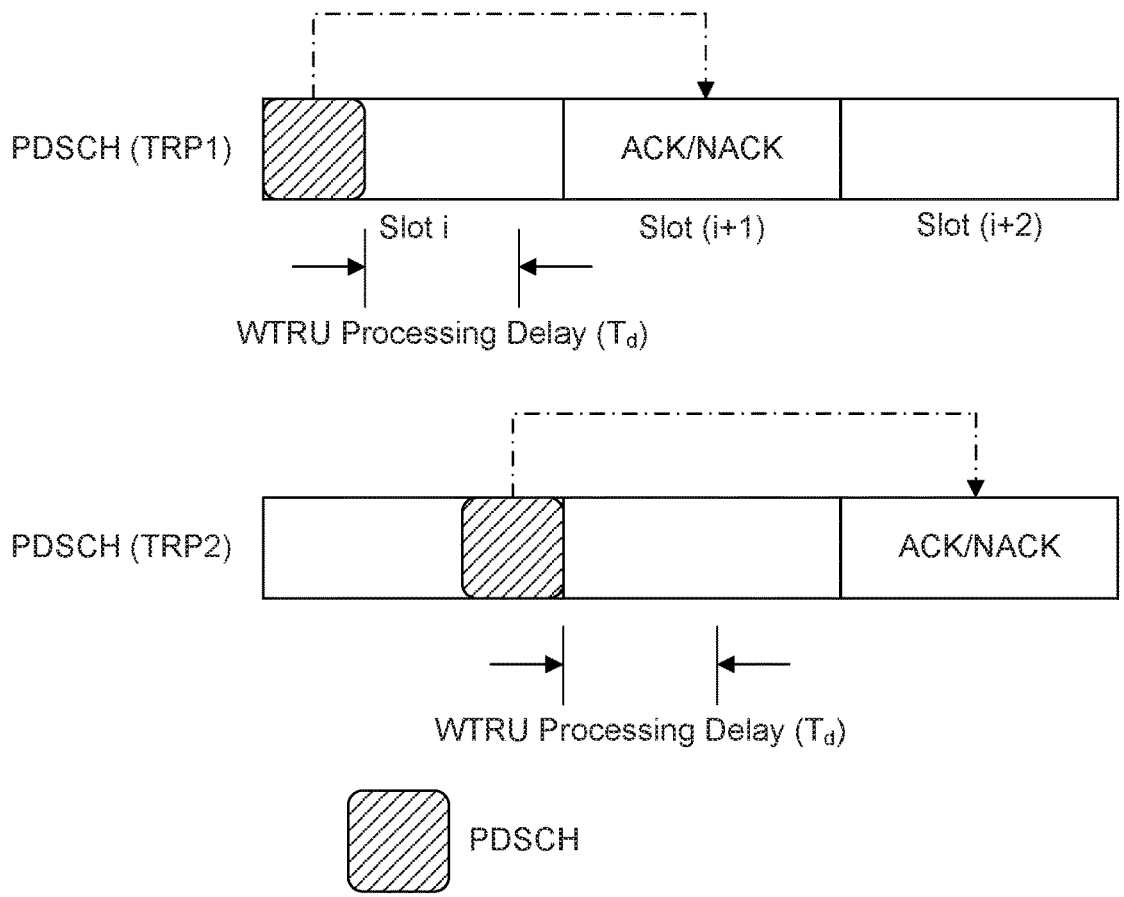
FIG. 4 is a diagram illustrating an example of a WTRU with a given WTRU processing delay of $T_d$.

FIG. 4 is a diagram illustrating an example of a WTRU with a given WTRU processing delay of $T_d$. In a multi-TRP downlink transmission scenario, the applicable PDSCH-to-HARQ timing offset (i.e., $K_1$) may be different for each TRP. For example, TRPs may not have a same PDSCH resource allocation within a slot, and hence different PDSCH-to-HARQ timing offsets may be needed. As shown in FIG. 4, for TRP 1, the PDSCH (i.e., the PDSCH reception) is located at the beginning of the Slot i based on PDSCH resource allocation from the TRP 1. Although there is a WTRU processing delay $T_d$, the WTRU may complete processing of the PDSCH within the Slot i, and thus the PUCCH (e.g., the ACK/NACK on the PUCCH) may be located at a slot immediately after the Slot i. However, by contrast, the PDSCH (i.e., the PDSCH reception) for TRP 2 may be located at the end of the Slot i based on a PDSCH resource allocation from the TRP 2, and the WTRU needs the Slot (i+1) in the time domain to process the PDSCH due to the WTRU processing delay $T_d$. Therefore, the PUCCH (e.g., ACK/NACK on the PUCCH) should be located at the Slot (i+2). In this case, due to different PDSCH resource allocations from different TRPs, different PDSCH-to-HARQ timing offsets (i.e., different $K_1$ values) may be required.

Figure 5:
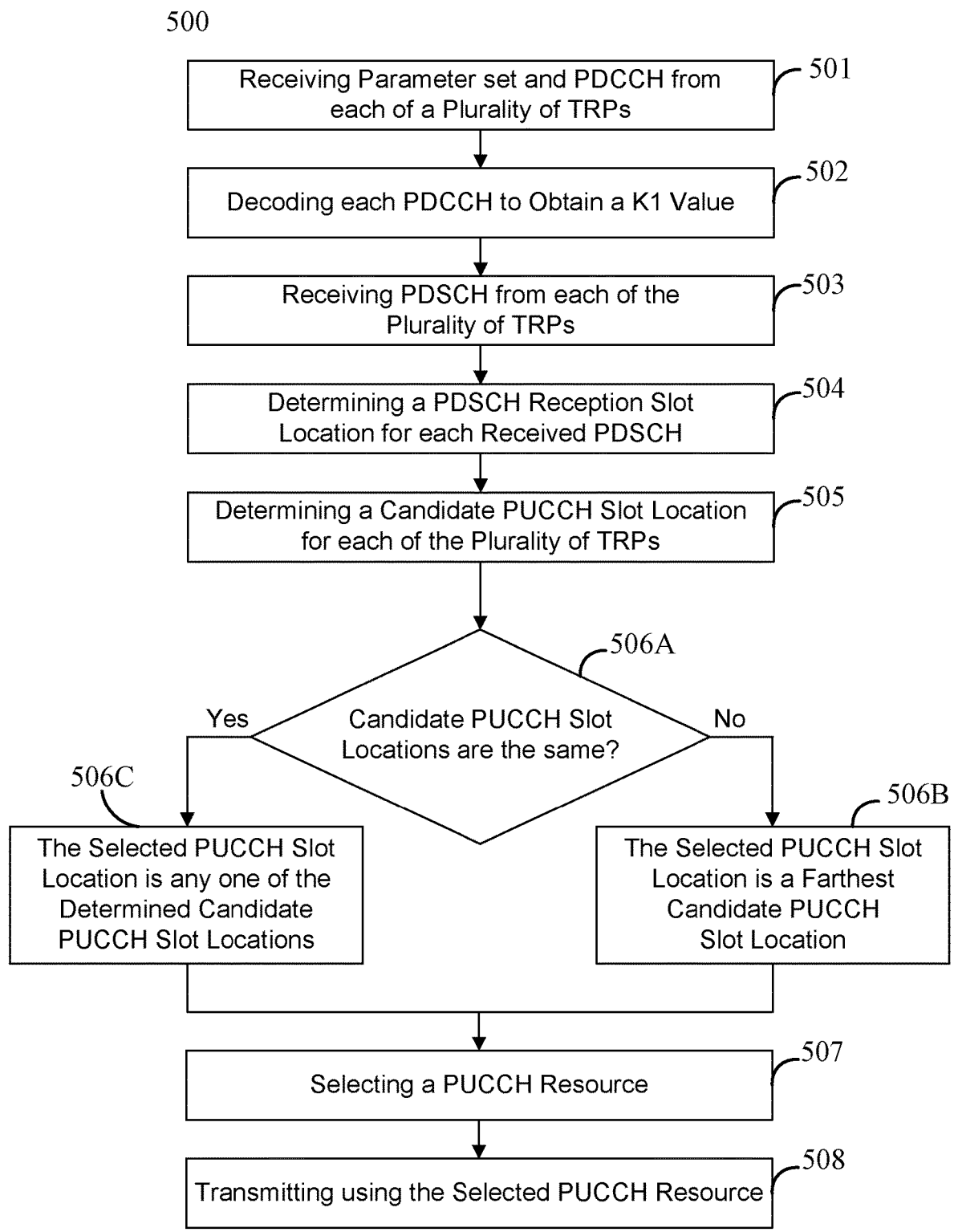
FIG. 5 is a flowchart illustrating a method of multi-TRP transmission according to an embodiment of this application.

FIG. 5 is a flowchart illustrating a procedure 500 of multi-TRP transmission. As shown in FIG. 5, the procedure begins with a WTRU, receiving a parameter set and a physical downlink control channel (PDCCH) transmission from each of a plurality of TRPs, at 501. Next, the WTRU decodes each received PDCCH transmission to obtain a $K_1$ value for each of the plurality of TRPs based on each received parameter set, at 502. Next, the WTRU may receive a physical downlink shared channel (PDSCH) transmission from each of the plurality of TRPs, at 503. Then, the WTRU may determine a PDSCH reception slot location for each received PDSCH transmission, at 504. Based on each determined PDSCH reception slot location and each obtained $K_1$ value, the WTRU may determine a candidate PUCCH slot location for each of the plurality of TRPs, at 505. Then the WTRU may determine a selected PUCCH slot location for all of the plurality of TRPs based on comparison of all of the determined candidate PUCCH slot locations, 506A, wherein at 506B, if all of the determined candidate PUCCH slot locations are not the same, the selected PUCCH slot location is a farthest candidate PUCCH slot location; and at 506C, if all of the determined candidate PUCCH slot locations are the same, the selected PUCCH slot location is any one of the determined candidate PUCCH slot locations. Based on this determination, the WTRU selects a PUCCH resource 507, and transmits on the selected PUCCH resource.

Corresponding to 501 shown in FIG. 5, a WTRU may be configured to receive a parameter set and a PDCCH transmission from each of a plurality of TRPs. For the WTRU to decode a PDCCH in order to receive a DCI, it has to determine a certain frequency range where a PDCCH might be located. But this information may be not provided to the WTRU beforehand and the location may change dynamically. The parameter set received from each of the TRPs may contain information about the certain frequency range that possibly carries a PDCCH. Within this range, the WTRU has to try to decode PDCCH through blind decoding or blind searching. It will be appreciated that PDCCH carries control information, i.e., DCI, for PDSCH and PUSCH, and DCI is a critical part of a PDCCH transmission. Therefore, to some extent, blind decoding PDCCH means blind decoding DCI. For the purpose of a clear and definite description of this application, unless otherwise indicated, the terms "PDCCH" and "DCI" may be used interchangeable herein.

In one embodiment, a parameter set received from each of the plurality of TRPs may comprise a control resource set (CORESET). CORESET is a set of physical resources (i.e, a specific region on NR Downlink Resource Grid) used to carry a PDCCH. In NR, a PDCCH does not span across a complete system bandwidth as it does in LTE, and a starting position of a PDCCH in the time domain may also be configurable. A CORESET may be use to localize a specific region in the frequency domain where a PDCCH (e.g., DCI) is located and thus can be used to assist in blind decoding.

There may be a plurality of sub-parameters within the CORESET, such as a Frequency Domain Parameter and a Time Domain Parameter. The Frequency Domain Parameter may be used to define a frequency domain width for the CORESET. The Time Domain Parameter may be used to define a time domain length of the CORESET. By using these two sub-parameters, those information such as frequency domain and the time domain occupied by the PDCCH (e.g., the number of OFDM symbols occupied by PDCCH) may be configured in the CORESET. Although the Frequency Domain Parameter and the Time Domain Parameter have been described above, they are not intended to be exclusive or be limiting to the present application. It will be appreciated that different sub-parameters within a CORESET for the purpose of applying the methods and the apparatus of multi-TRPs transmission disclosed in this application may be available.

In one embodiment, the parameter set received from each of the plurality of TRPs may comprise a Search Space. Search Space and CORESET are closely associated with each other. Search Space also may refer to the area in the downlink resource grid where a PDCCH may be carried. A WTRU may perform blind decoding throughout a search space in order to find PDCCH data (e.g., DCI). Through a Search Space, information such as a starting OFDM symbol number and PDCCH monitoring period may be configured. Thus, a WTRU may locate a PDCCH by decoding information in the Search Space.

The CORESET and the Search Space described above are two examples of a parameter set that may be used by the WTRU to locate and blind decode a PDCCH. However, it will be appreciated that these examples are not intended to be exclusive or be limiting to the embodiments described herein. A parameter set other than the CORESET and the Search Space may be available as long as that parameter set can be used for locating and/or blind decoding a PDCCH. By using the parameter set, the WTRU may determine a certain frequency range where the PDCCH might be located and enable the blind decoding.

It should be appreciated that the term "parameter set" here is a collective concept, that is to say, the parameter set received from each of the TRPs is not limited to be only one parameter, such as the CORESET mentioned above. It may comprise a plurality of parameters. For example, the parameter set may comprise both the CORESET and the Search Space.

The parameter set received from each of the plurality of TRPs may be not the same. For example, in one embodiment, there are three TRPs, i.e., a first TRP, a second TRP and a third TRP. The parameter set received from the first TRP may comprise a CORESET, the parameter set received from the second TRP may comprise a Search Space, and the parameter set received from the third TRP may comprise both a CORESET and a Search Space.

It will be appreciated that the above mentioned three different parameter sets respectively from three different TRPs are only described by way of example, and they are not intended to be exclusive or be limiting to the methods and apparatus of multi-TRP transmission described in this application.

Corresponding to 502 shown in FIG. 5, the WTRU is configured to decode each received PDCCH to obtain a $K_1$ value for each of the plurality of TRPs based on each received parameter set.

It will be appreciated that since $K_1$ indicates a time offset between a PDSCH reception and an ACK/NACK transmission on a PUCCH, the significance of the term "$K_1$" lies in its value. Therefore, for the purpose of clear and definite description, the terms "$K_1$" and "$K_1$ value" share the same or similar meaning, and unless otherwise indicated, they are interchangeable in this application.

It will be appreciated that a slot location is a critical aspect of the methods and apparatus of multi-TRPs transmission disclosed in this application, and thus the application of the term "slot" and other similar terms, such as "Slot i" and "Slot i+2" is for the purpose of indicating the location of that slot within a sub-frame or a frame. They are not used to describe those resources or symbols within a slot, such as Resource Element or Control Channel Element within a slot. Therefore, unless otherwise indicated, those terms, such as "slot", "Slot i" and "Slot i+2" mean slot locations corresponding to those slots.

Corresponding to 503 shown in FIG. 5, the WTRU is configured to receive a PDSCH transmission from each of the plurality of TRPs.

In embodiments of this application, there may be more than two TRPs, such as, a primary TRP (P-TRP), a secondary TRP (S-TRP), and a third TRP. Therefore, the WTRU may communicate with and receive a PDSCH transmission (NR-PDSCH 1) from the P-TRP, a PDSCH transmission (NR-PDSCH 2) from the S-TRP, and a PDSCH transmission (NR-PDSCH 3) from the third TRP.

It will appreciate that the above-mentioned example in which a WTRU receives a PDSCH from each of three TRPs is not intended to be exclusive or be limiting to the present application. For example, there may be four TRPs which the WTRU can communicate with, and thus the WTRU may receive a PDSCH transmission (NR-PDSCH 1) from a first TRP, a PDSCH transmission (NR-PDSCH 2) from a second TRP, a PDSCH transmission (NR-PDSCH 3) from a third TRP, and a PDSCH transmission (NR-PDSCH 4) from a fourth TRP.

Corresponding to 504 shown in FIG. 5, the WTRU is configured to determine a PDSCH reception slot location for each received PDSCH.

Figure 6:
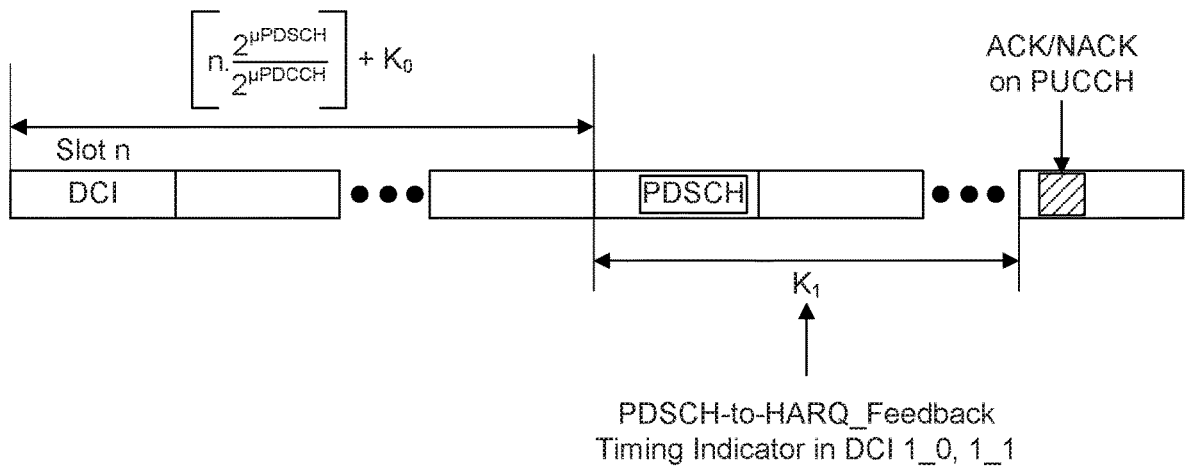
FIG. 6 is a diagram illustrating an example of $K_0$ and $K_1$ according to an embodiment of this application.

FIG. 6 shows an example of slots for DCI and PDSCH transmission. As shown in FIG. 6, a Time Domain resource allocation for PDSCH (DCI-PDSCH Timing) Resource allocation in the time domain can be used to determine the PDSCH reception slot location. For PDSCH, its relative slot location to DCI is indicated by the $K_0$ value in the DCI. For example, if $K_0=0$, then the PDSCH and the PDCCH are in the same slot; if $K_0=1$, then the PDSCH is one slot after the PDCCH in time domain; if $K_0=2$, then the PDSCH is two slots after the PDCCH in time domain, and so on.

Figure 7A:
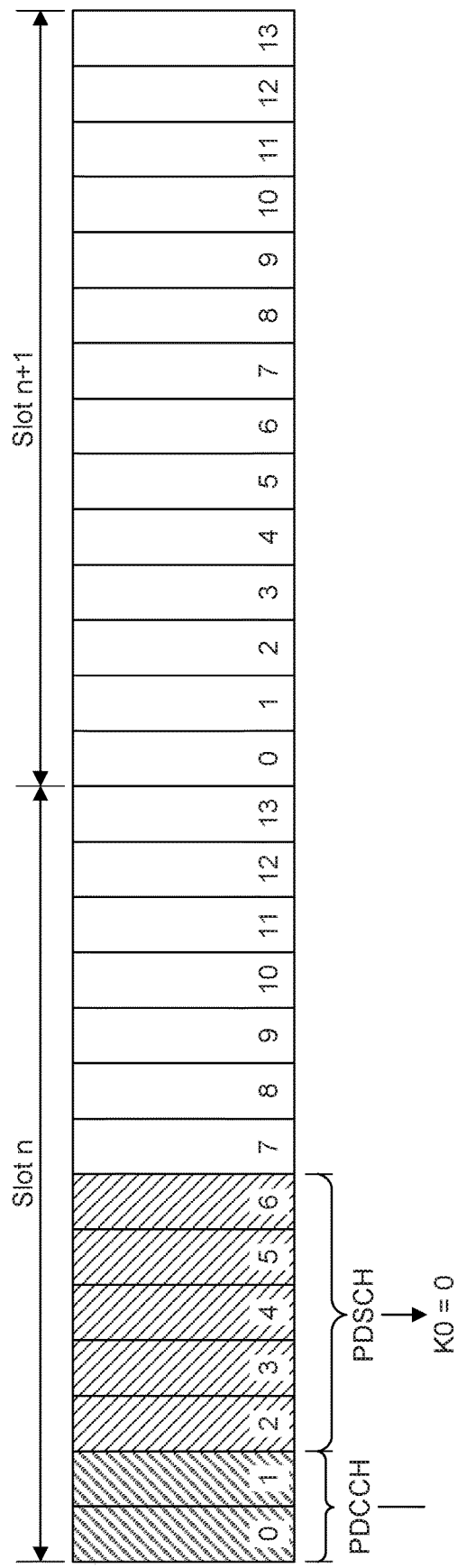
FIG. 7A is a diagram illustrating a relative slot location between PDCCH and PDSCH according to an embodiment of this application.
Figure 7B:
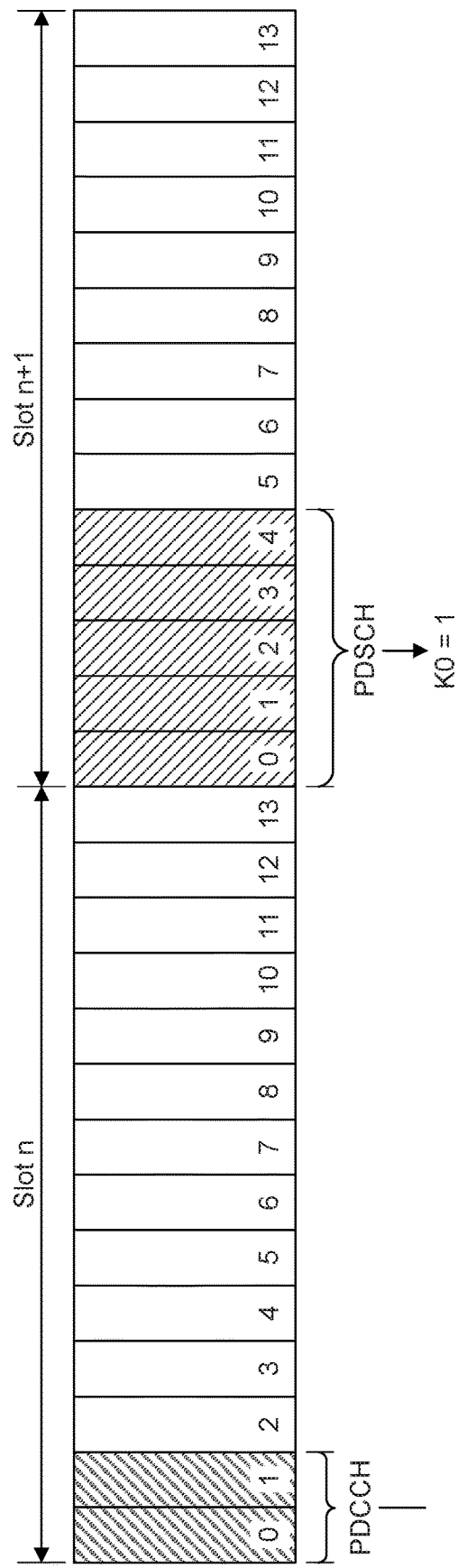
FIG. 7B is a diagram illustrating another relative slot location between PDCCH and PDSCH according to an embodiment of this application.

$K_0$ is based on a numerology of a PDSCH. In the downlink, the WTRU is schedule to receive a PDSCH transmission through a DCI, that is, the time domain resource assignment filed of DCI provides a row index to an allocation table, where the row index defines a $K_0$, a start and length indicator SLVIA and a PDSCH mapping type. A starting symbol (i.e., the start of the slot) and the number of consecutive symbols counting from the starting symbol allocated for the PDSCH are determined from the start and length indicator SLIVA. As shown in FIGS. 7A and 7B, the slot allocated for the PDSCH is defined as $[n(2^{\mu PDSCH}/2^{\mu PDCCH})]+K_0$, where μPDSCH and μPDCCH are subcarrier spacing configurations for the PDSCH and the PDCCH, respectively.

FIGS. 7A and 7B illustrate two examples of the PDSCH reception slot location. As shown in FIGS. 7A and 7B, each slot has 14 symbols (i.e., symbols 0-13). As shown in FIG. 7A, $K_0=0$ and the PDSCH and the PDCCH are in the same slot, i.e., the slot n. Symbols 0 and 1 carry the PDCCH, and Symbols 2-6 carry the PDSCH. As shown in FIG. 7B, $K_0=1$, so the PDSCH is in the slot n and PDCCH is in the slot n+1. Symbols 0 and 1 in slot n carry the PDCCH, and Symbols 0-4 in slot n+1 carry the PDSCH.

It will be appreciated that these two examples shown by FIGS. 7A and 7B are not intended to be exclusive and be limiting to the present application. The PDSCH reception slot location may vary based on different $K_0$ values and other parameters within the PDCCH.

It will also be appreciated that since $K_0$ indicates the time offset between a PDCCH and a reception of a PDSCH transmission, the significance of the term "$K_0$" lies in its value. Therefore, for the purpose of clear and definite description, the terms "$K_0$" and "$K_0$ value" may share the same or similar meaning, and unless otherwise indicated, they are interchangeable herein.

Although the above embodiments illustrate that the WTRU may receive the PDCCH transmission first and then receive the PDSCH transmission second, it will be appreciated that those embodiments are not intended to be exclusive or be limited to this application. For example, a TRP may transmit both PDCCH and PDSCH at the same time to a WTRU, and thus the WTRU may receive both the PDCCH transmission and the PDSCH transmission at the same time. After receiving the PDCCH transmission and the PDSCH transmission, the WTRU will blind search and decode the PDCCH transmission by using a parameter set (e.g., CORESET), and then use a DCI from the decoded PDCCH transmission to decode the PDSCH transmission.

Corresponding to 505 shown in FIG. 5, the WTRU is configured to determine, based on each determined PDSCH reception slot location and each obtained $K_1$ value, a candidate PUCCH slot location for each of the plurality of TRPs.

The WTRU may determine that an ACK/NACK transmission on a PUCCH will occur $K_1$ slots after a reception of a PDSCH transmission. For example, if $K_1=0$, then the PDSCH transmission and the ACK/NACK transmission on the PUCCH are in the same slot; if $K_1=1$, then the ACK/NACK transmission on the PUCCH is one slot in time domain after the reception of the PDSCH transmission; if $K_1=2$, then the ACK/NACK transmission on the PUCCH is two slots in time domain after the reception of the PDSCH transmission, and so on.

Figure 8:
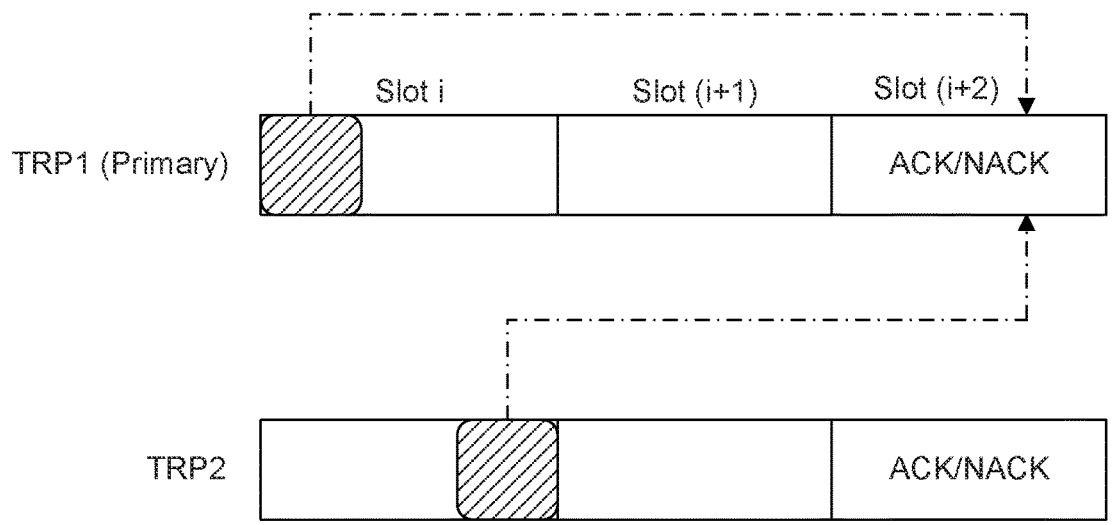
FIG. 8 is a diagram illustrating an example of ACK/NACK transmissions according to an embodiment of this application.
Figure 8:

FIG. 8 illustrates two examples of the candidate PUCCH transmission slot location. For these two examples, the $K_1$ value is 2, i.e., an ACK/NACK transmission on a PUCCH is two slots after the reception of the PDSCH transmission. As shown in FIG. 8, the candidate PUCCH transmission slot locations for both the TRP 1 (i.e., the Primary TRP shown in FIG. 2) and the TRP 2 (i.e., the secondary TRP shown in FIG. 2) are the same, i.e., the Slot (i+2), and thus the ACK/NACK transmissions for both the TRP 1 and TRP 2 have the same slot in the time domain, i.e., the Slot (i+2).

Figure 9:
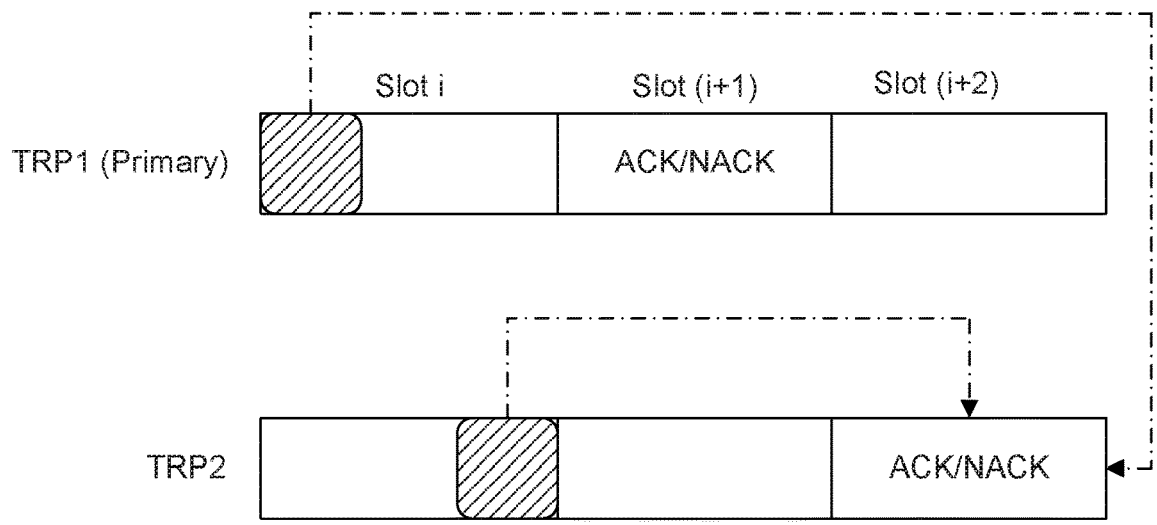
FIG. 9 is a diagram illustrating another example of ACK/NACK transmissions according to an embodiment of this application.
Figure 9:

FIG. 9 illustrates another two examples of the candidate PUCCH transmission slot location. As discussed above, different TRPs may receive different $K_1$ values. In these two examples, the $K_1$ values for TRP 1 and TRP 2 are different. As shown in FIG. 9, the $K_1$ value for the TRP 1 is 1, which means the ACK/NACK transmission on PUCCH for the TRP 1 is one slot after the PDSCH, i.e., the slot for the ACK/NACK transmission is the Slot (i+1). Thus, the candidate PUCCH transmission slot location for TRP 1 is the Slot (i+1). The $K_1$ value for the TRP 2 is 2, which means the ACK/NACK transmission on PUCCH for the TRP 2 is two slots after the reception of the PDSCH transmission, i.e., the slot for the ACK/NACK transmission is the Slot (i+2). Thus, the candidate PUCCH transmission slot location for the TRP 2 is the Slot (i+2). Therefore, in these examples, if the WTRU sends an ACK/NACK transmission for each PDSCH received from the TRP 1 and the TRP 2, those ACK/NACK transmissions will occur within different slots in the time domain. The methods and apparatus of multi-TRP transmission disclosed in this application may solve this slot difference and use a single slot (i.e., single PUCCH resource) to do a PUCCH transmission for both PDSCH transmissions received from the TRP 1 and the TRP 2.

As discussed above, in some embodiments, there may be more than two TRPs. In those embodiments, a $K_1$ value for each TRP might be different from each other. For example, $K_1$ value for TRP 1 is 0; $K_1$ value for TRP 2 is 1; and $K_1$ value for TRP 2 is 2. The following description will describe different $K_1$ values for different TRPs and how to determine a desired slot for a PUCCH transmission (e.g., an ACK/NACK transmission) in more detail with reference to FIG. 5, FIG. 8 and FIG.9.

Corresponding to 506A shown in FIG. 5, the WTRU is configured to determine a selected PUCCH transmission slot location for all of the plurality of TRPs based on a comparison of all of the determined candidate PUCCH slot locations. Corresponding to 506B shown in FIG. 5, if all of the determined candidate PUCCH slot locations are the same, the WTRU may determine that the selected PUCCH slot location is any one of the determined candidate PUCCH slot locations. Corresponding to 506C shown in FIG. 5, if all of the determined candidate PUCCH slot locations are not the same, the WTRU may determine that the selected PUCCH transmission slot location is a farthest candidate PUCCH slot location.

As shown in FIG. 8, the candidate PUCCH transmission slot location for the TRP 1 is the Slot (i+2), and the candidate PUCCH transmission slot location for the TRP 2 is also the Slot (i+2). Therefore, based on comparison of these determined candidate PUCCH transmission slot locations (i.e., Slots (i+2)), the WTRU may determine either the Slot (i+2) of the TRP 1 or the Slot (i+2) of the TRP 2 to be the selected PUCCH slot location. In other words, any one of the determined candidate PUCCH transmission slot locations may be the selected PUCCH transmission slot location.

Although FIG. 8 illustrates an example in which both the TRP 1 and the TRP 2 share the same candidate PUCCH transmission slot location in the time domain, this example does not intend to be exclusive or be limiting to the present application. For example, in one embodiment, there are three TRPs, and all of them may share the same candidate PUCCH transmission slot location in the time domain. In that embodiment, a WTRU may determine any one of the same candidate PUCCH transmission slot locations of those TRPs to be the selected PUCCH transmission slot location for all TRPs.

As shown in FIG. 9, the candidate PUCCH transmission slot location for the TRP 1 is the Slot (i+1), and the candidate PUCCH transmission slot location for the TRP 2 is the Slot (i+2). The Slot (i+2) is a later slot than the Slot (i+1), that is to say, the Slot (i+2) is the farthest candidate PUCCH transmission slot location for both the TRP 1 and the TRP 2. Therefore, the WTRU may determine the Slot (i+2) for the TRP 2 to be the selected PUCCH transmission slot location for PUCCH transmissions for both the TRP 1 and the TRP 2.

Although FIG. 9 illustrates an example that the determined candidate PUCCH transmission slot locations for the TRP 1 and the TRP 2 are not the same, this example does not intend to be exclusive or be limiting to the present application. For example, in one embodiment, there are three TRPs (i.e., TRP 1, TRP 2 and TRP 3), and a WTRU has already determined that candidate PUCCH transmission slot locations for those three TRPs are not the same. For example, the candidate PUCCH transmission slot location for the TRP 1 is Slot (i+1), the candidate PUCCH transmission slot location for the TRP 2 is Slot (i+2), and the candidate PUCCH transmission slot location for the TRP 3 is Slot (i+3). Then in that case, the WTRU may determine the Slot (i+3) for the TRP 3 to be the selected PUCCH transmission slot location for all of the three TRPs because the Slot (i+3) is located at the farthest candidate PUCCH transmission slot location among these three candidate PUCCH transmission slot locations.

It will be appreciated that the above-mentioned embodiments of determining the selected PUCCH slot location for all of the three TRPs are not exclusive and to be limiting to the present methods and apparatus disclosed in this application. It will be appreciated that the methods and apparatus of multi-TRP transmission disclosed here in this application may be applied to different scenarios with different number of TRPs and/or with different candidate PUCCH slot locations.

Corresponding to 507 shown in FIG. 5, the WTRU may be configured to select a PUCCH resource of a TRP in a slot corresponding to the selected PUCCH transmission slot location as a selected PUCCH resource for all of the plurality of TRPs.

In one embodiment, the WTRU may be configured with one or more PUCCH resource sets for a plurality of TRPs, wherein each resource set may be associated with a TRP of the plurality of TRPs. The WTRU may utilize those resources in the PUCCH resource sets to determine a selected PUCCH resource for a multi-TRP PUCCH transmission. For example, in an embodiment shown with FIG. 9, the WTRU may be configured with two PUCCH resource sets, i.e., a first PUCCH resource set for the TRP 1 and a second PUCCH resource set for the TRP 2. Therefore, in this embodiment, the WTRU may select a PUCCH resource of the TRP 2 from the second PUCCH resource set 2 as the selected PUCCH resource for PUCCH transmission to both the TRP 1 and the TRP 2. In time domain, the selected PUCCH resource is located in the slot (i+2) of the TRP 2 which corresponds to the selected PUCCH slot location, i.e., the slot (i+2).

In one embodiment, the WTRU may have a PUCCH resource configuration provided by a higher layer parameter for each of a plurality of TRPs. The WTRU may use the PUCCH resource configurations to determine a selected PUCCH resource for multi-TRP PUCCH transmission. For example, in an embodiment shown with FIG. 9, the WTRU may have two PUCCH resource configurations, i.e., a first PUCCH resource configuration for the TRP 1 and a second PUCCH resource configuration for the TRP 2. Therefore, in this embodiment, the WTRU may select a PUCCH resource based on the second PUCCH resource configuration as the selected PUCCH resource for multi-TRP PUCCH transmission to both the TRP 1 and the TRP 2. In the time domain, the selected PUCCH resource is located in the slot (i+2) of the TRP 2 which corresponds to the selected PUCCH slot location, i.e., the slot (i+2).

To be more specific, in order to select the selected PUCCH resource, the WTRU may calculate a PUCCH resource index. For example, in the embodiment shown with FIG. 9, the WTRU may calculate a PUCCH resource index of the TRP 2 so as to select the PUCCH resource of the TRP 2 in slot (i+2) as the selected PUCCH resource for PUCCH transmission to both the TRP 1 and the TRP 2. The resource index may be calculated based on the number of CCEs in the CORESET received by the TRP 2, an index of a first CCE of the PDCCH received by the TRP 2 and a PUCCH resource indicator field in the DCI decoded from the PDCCH.

It will be appreciated that the above-mentioned ways of selecting a PUCCH resource of a TRP in a slot corresponding to the selected PUCCH transmission slot location as a selected PUCCH resource for multi-TRP PUCCH transmission are only described by way of example. They are not intended to be exclusive or be limiting to the present application.

Corresponding to 508 shown in FIG. 5, the WTRU may be configured to transmit a selected PUCCH transmission to all of the plurality of TRPs by using the selected PUCCH resource.

A WTRU with multiple PDCCHs scheduling multiple PDSCH transmissions may do PUCCH transmissions to all of a plurality of TRPs within a same slot. The WTRU may transmit an ACK/NACK report for both PDSCH transmissions to the same TRP. For example, in an embodiment shown in FIG. 2 and FIG. 9, the WTUR may transmit an ACK/NACK report for both NR-PDSCH 1 and NR-PDSCH 2, and the ACK/NACK report will be transmitted to both the P-TRP (i.e., TRP 1) and the S-TRP (i.e., TRP 2).

A PUCCH transmission may carry Uplink Control Information (UCI), including a HARQ-ACK report in response to a PDSCH, Scheduling Request (SR) which is used to request resources for uplink data transmission, Channel State Information (CSI) report which is used for link adaptation and downlink data scheduling. More specifically, CSI report may include Channel Quality Indicator (CQI), Pre-coding, Matrix Indicator (PMI), Rank Indicator (RI), Layer Indicator (LI) and beam related information.

As shown in FIG. 8, in the time domain, before the selection of the selected PUCCH resource, the WTRU may determine a candidate PUCCH transmission in the slot (i+2) for the TRP 1, and the WTRU may determine a candidate PUCCH transmission in the slot (i+2) for the TRP 2. The candidate PUCCH transmission in the slot (i+2) for the TRP 1 may comprise a candidate ACK/NACK report for the multi-TRP PUCCH transmission, and the candidate PUCCH transmission in the slot (i+2) for the TRP 2 may comprise another candidate ACK/NACK report for the multi-TRP PUCCH transmission. In the embodiment shown with FIG. 8, after the WTRU selects the PUCCH resource of the TRP 1 in the slot (i+2) as the selected PUCCH resource for all of the plurality of TRPs based on either the PUCCH resource set or the PUCCH resource configuration of the TRP 1, the candidate PUCCH transmission in the slot (i+2) for the TRP 1 may become a selected PUCCH transmission for the multi-TRP PUCCH transmission, and thus the candidate ACK/NACK within the selected PUCCH becomes a selected ACK/NACK.

Therefore, as shown in FIG. 6, in the time domain, before the selection of the selected PUCCH resource, the PUCCH transmission is a candidate PUCCH transmission, and the ACK/NACK is a candidate ACK/NACK, and the $K_1$ value defines a time offset between the reception of the PDSCH and the candidate PUCCH transmission (e.g., the candidate ACK/NACK).

In one embodiment, the WTRU is configured to drop a candidate ACK/NACK report in a slot not corresponding to the selected PUCCH slot location.

In the embodiment shown in FIG. 8, the WTRU has determined that the selected PUCCH transmission slot location is the Slot (i+2) of the TRP 1. Therefore, the WTRU may drop the candidate PUCCH transmission (e.g., the candidate ACK/NACK) scheduled in the Slot (i+2) of the TRP 2, and may transmit the selected PUCCH transmission (e.g., the selected ACK/NACK) for both TRPs in the Slot (i+2) of the TRP 1.

In the embodiment shown in FIG. 9, the WTRU has determined that the selected PUCCH transmission slot location is the Slot (i+2) of the TRP 2. Therefore, the WTRU may drop the candidate PUCCH transmission (e.g., the candidate ACK/NACK) scheduled in the Slot (i+1) of the TRP 1, and may transmit the selected PUCCH transmission (e.g., the selected ACK/NACK) for both TRPs in the Slot (i+2) of the TRP 2.

Where multiple DCIs schedule multiple PDSCH transmissions from multiple TRPs in a serving cell, a WTRU may determine quasi co-location information for the PDCCH receptions from multiple TRPs according to one of a number of different approaches. For example, the WTRU may implicitly determine the quasi co-location information using an association between the TRP or TRP set index and a control resource set index from a set of configured control resource sets and/or search space index from the set of configured search spaces used for the PDCCH transmissions. Alternatively or additionally, a WTRU may explicitly be provided, by higher layers, with an antenna port quasi co-location mapping, from a set of antenna port quasi co-locations, indicating quasi co-location information for the DM-RS antenna port for PDCCH receptions from the corresponding TRP or TRP set.

Where the WTRU implicitly determines the quasi co-location information, the WTRU may assume that the lowest indexed TRP or TRP set is quasi co-located with the lowest indexed control resource set used for PDCCH transmission (e.g., CORESET-ID) and/or may assume that the lowest indexed TRP or TRP set is quasi co-located with the lowest indexed search space used for PDCCH transmission (i.e., SearchSpace-ID). In the case of multi-beam CORESET operation, the WTRU may assume that the lowest indexed TRP or TRP set is quasi co-located with the lowest indexed OFDM symbol of the control resource set within a slot used for PDCCH transmission.

Where the WTRU is explicitly provided with an antenna port quasi co-location mapping, a configuration in the radio resource control (RRC) may map the DM-RS antenna port associated with PDCCH receptions from a TRP or a TRP set to one or more DL-RSs configured by the TCI state. For example, the higher layer parameter TCI-States PDCCH may be used, which may contain a single or multiple TCI state for PDCCH receptions from multiple TRPs. The WTRU may assume that the DM-RS antenna port associated with PDCCH reception from the corresponding TRP or TRP set is quasi co-located (e.g., with respect to average gain, quasi co-location (QCL)-TypeA properties, and QCL-TypeD properties) with the corresponding synchronization sequence (SS)/physical broadcast channel (PBCH) block the WTRU identified during the initial access procedure.

Where a single DCI schedules multiple PDSCH transmissions from multiple TRPs in a serving cell, the WTRU may determine the quasi co-location information for the PDCCH reception from multiple TRPs according to one of a number of different approaches. For example, the WTRU may assume that the DM-RS antenna port associated with PDCCH reception is quasi co-located with the lowest indexed TRP or TRP set. For another example, a single DCI may schedule multiple PDSCH transmissions from multiple TRPs in a serving cell, and the DCI may not carry transmission configuration indication (TCI) fields, such as where the PDSCHs are scheduled with DCI format 1_0 or where the WTRU is not configured with tci-PresentInDCI for the CORESET scheduling the PDSCH for DCI format 1_1. In such scenarios, the WTRU may determine the quasi co-location information for the PDSCH receptions as follows. If a WTRU is scheduled with one codeword, the WTRU may implicitly determine the quasi co-location information using an association between the TRP or the TRP set index and the DM-RS antenna port index among the DM-RS antenna ports assigned for the PDSCH transmission. For example, the WTRU may assume that the lowest indexed TRP or TRP set is quasi co-located with the lowest indexed DM-RS antenna port among the DM-RS antenna ports assigned for the PDSCH transmission; or the WTRU may assume that the second lowest indexed TRP or TRP set is quasi co-located with the second lowest indexed DM-RS antenna port among the DM-RS antenna ports assigned for the PDSCH transmission. If a WTRU is scheduled with two codewords, the WTRU may implicitly determine the quasi co-location information using an association between the TRP or TRP set index, codeword index, the MCS indices of the two codewords, and/or DM-RS antenna port index among the DM-RS antenna ports assigned for each codeword. For example, the WTRU may assume that the lowest indexed TRP or TRP set is quasi co-located with the lowest indexed DM-RS antenna port among the DM-RS antenna ports assigned for the lowest indexed codeword (e.g., codeword 0). The WTRU may assume that the lowest indexed TRP or TRP set is quasi co-located with the lowest indexed DM-RS antenna port among the DM-RS antenna ports assigned for the codeword with the higher(lower) MCS.

In embodiments, a WTRU may be configured to support MTRP reception. The activation of the support may be triggered dynamically, such as by a DCI or a MAC CE control element (CE), or it may be triggered semi-statically for a given period of time.

In embodiments, a WTRU may identify multiple DCIs scheduling multiple PDSCHs for transmission from multiple TRPs using a newly defined RNTI for multi-TRP operation (e.g., MTRP-RNTI). In one example, the MTRP-RNTI may be provided by higher layer signaling and may be scrambled with the cyclic redundancy check(CRC) parity bits of the DCIs scheduling multiple PDSCHs for transmission from multiple TRPs. In another example, the WTRU may implicitly determine operation in MTRP mode through DCI field validation. For example, if a WTRU receives two DCIs with the same Format 1_1, a WTRU may use commonality of some of the DCI fields as an indication of MTRP reception where each received DCI carries scheduling information for a corresponding PDSCH layer. In one example, a WTRU may compare certain fields for multiple DCIs scheduling multiple PDSCHs for transmission from multiple TRPs. If multi-DCI validation is achieved, the WTRU may consider the information in multiple DCIs as an indication of multi-TRP transmission. If multi-DCI validation is not achieved, the WTRU may consider the multiple DCIs as having been detected with non-matching CRCs.

Table 1 below provides an example of how some of the DCI fields in DCI Formats 1_0 and 1_1 may be used as a validation mechanism for multi-TRP transmission. A WTRU may not expect to receive different TPC commands for scheduled PUCCH, PUCCH resource indicators, and PDSCH-to-HARQ feedback timing indicators across multiple PDCCHs/DCIs. Accordingly, scheduling for multiple PDSCHs for transmission from multiple TRPs may be expected to be the same. However, the WTRU may expect a different transmission configuration indication (TCI) for PDSCH transmissions from multiple TRPs.

If a WTRU receives multiple PDCCHs scheduling multiple PDSCHs, the WTRU may implicitly determine operation in MTRP mode through the combination of the received DCI formats. In an embodiment, a WTRU may determine MTRP operation by detecting reception of DCI Formats 1_1 and 1_0 where the first DCI Format 1_1 carries all the scheduling information for both layers and the second DCI Format 1_0 may indicate an MTRP transmission. In an embodiment, a WTRU may compare certain fields of the received multiple DCIs to validate operation in MTRP mode.

TABLE 1

| DCI Field | Validation criterion |
| --- | --- |
| TPC command for scheduled PUCCH | Same for multiple DCIs scheduling Multiple TRPs |
| PUCCH resource indicator | Same for multiple DCIs scheduling Multiple TRPs |
| PDSCH-to-HARQ_feedback timing indicator | Same for multiple DCIs scheduling Multiple TRPs |
| Transmission configuration indication | Different for multiple DCIs scheduling Multiple TRPs |

For multi-TRP operation, the WTRU may be configured by higher layers with multiple control resource sets (CORESETs) where each CORESET configuration may include an antenna port quasi co-location, from a set of antenna port quasi co-locations, indicating quasi co-location information of the DM-RS antenna port for PDCCH/PDSCH reception from the corresponding TRP. The WTRU may expect that the number of configured CORESETs for multi-TRP operation is smaller than or equal to the number of configured TRPs.

Figure 10:
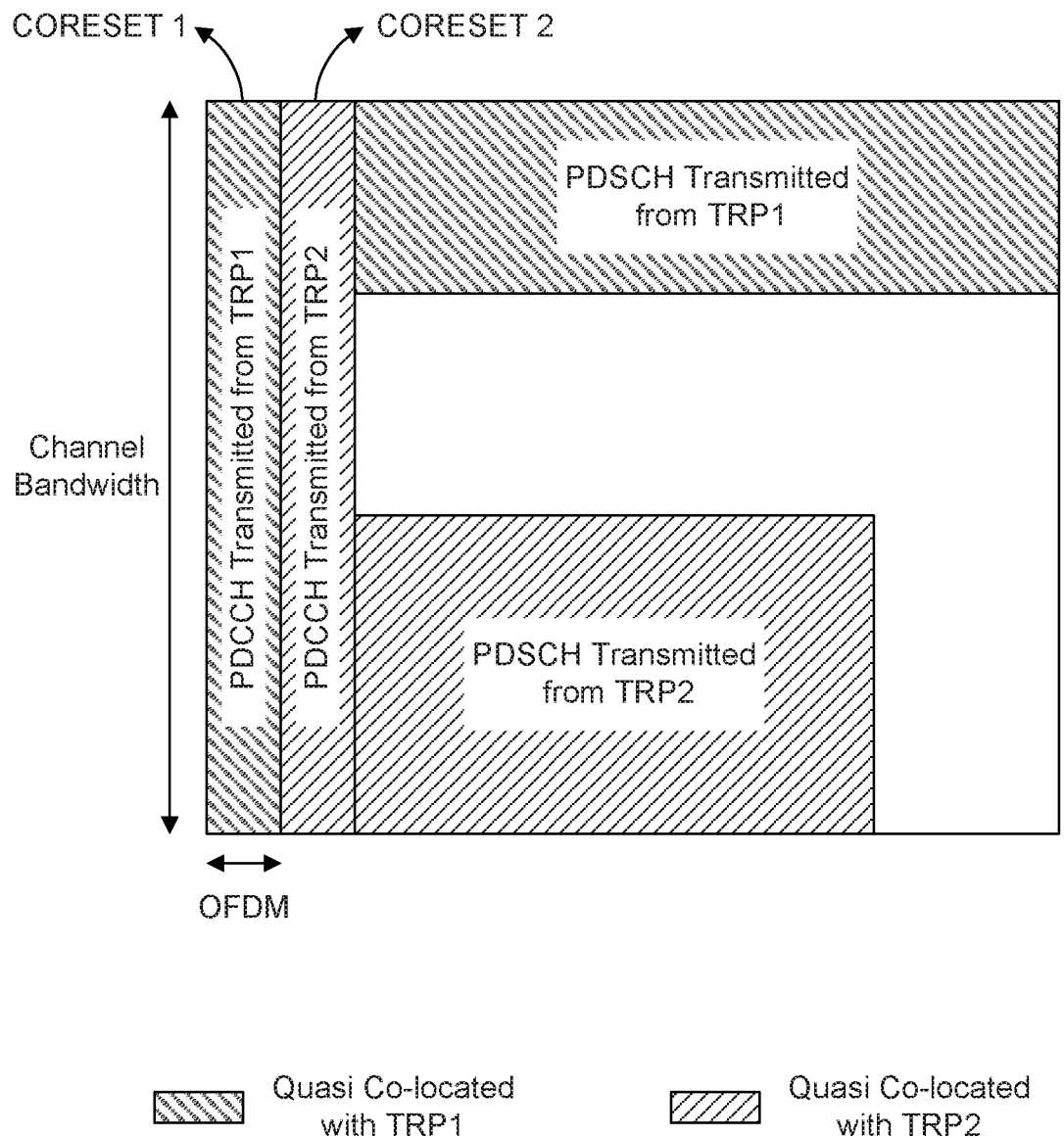
FIG. 10 is a diagram showing an example of a control resource set (CORESET) configuration where the number of configured CORESETs is equal to the number of configured TRPs.

On a condition that the number of configured CORESETs is equal to the number of configured TRPs, the WTRU may assume that the DM-RS antenna port associated with PDCCH/PDSCH reception in a CORESET is quasi co-located (e.g., with respect to average gain, QCL-TypeA, and QCL-TypeD properties) with the transmissions from a corresponding TRP. FIG. 10 is a diagram showing an example of a CORESET configuration where the number of configured CORESETs is equal to the number of configured TRPs.

On a condition that the number of configured CORESETs is smaller than the number of configured TRPs, the WTRU may assume that the DM-RS antenna port associated with PDCCH/PDSCH reception in a CORESET is quasi co-located (e.g., with respect to average gain, QCL-TypeA, and QCL-TypeD properties) with the transmissions from multiple TRPs or a TRP set.

In an embodiment, format 1_0 may be configured with implicit QCL indication (QCL of CORSET1 applies TRP1, i.e., CORSET1 to TRP1, CORSET2 to TRP2), and format 1_1 may be configured with explicit QCL indication (QCL of each PDSCH indicated in the respective TCI).

One or more transmission configuration indication (TCI) states may be configured or used, wherein a TCI state may include one or more downlink reference signals (e.g., SS/PBCH block, CSI-RS, CSI-RS for tracking) and its associated QCL type (e.g., QCL type A, B, C, D). A TCI state may determine a spatial Rx (e.g., QCL type D).

One or more modes of operation may be used based on number of TRPs associated with a downlink control channel, wherein a downlink control channel may be a downlink control channel in which a WTRU monitors a DCI. Hereinafter, downlink control channel, CORESET, and search space may be used interchangeably.

In an embodiment, a WTRU may determine a TCI state for a search space based on a mode of operation. For example, in a first mode of operation, a WTRU may determine a TCI state for a search space based on a TCI state configured for the associated CORESET. In a second mode of operation, a WTRU may determine a TCI state for a search space based on the TCI state configured for the search space.

In an embodiment, a WTRU may monitor a search space (or attempt to decode one or more PDCCH candidates in a search space) with a first TCI state if the WTRU is in a first mode of operation, and the WTRU may monitor a search space with a second TCI state if the WTRU is in a second mode of operation. The first TCI state may be a TCI state configured for a CORESET associated with the search space, and the second TCI state may be a TCI state configured for the search space.

A mode of operation may be determined based on the DCI format, wherein a first DCI format may be used for a single TRP operation (e.g., a single TCI state associated with a scheduled PDSCH) and a second DCI format may be used for a multi-TRP operation (e.g., more than one TCI state associated with a scheduled PDSCH). Alternatively or additionally, a mode of operation may be determined based on the number of DM-RS groups (or DM-RS port groups) used for a PDSCH. For example, a single DM-RS group (or DM-RS port group) may be used for a PDSCH in a first mode of operation, and two DM-RS groups (or DM-RS port groups) may be used for a PDSCH in a second mode of operation. Additionally or alternatively, a mode of operation may be determined based on an RNTI scrambled with the CRC of the DCI that may be monitored in the search space.

A WTRU may monitor a search space (or attempt to decode one or more PDCCH candidates in a search space) with one or more TCI sates, wherein a TCI state may be determined based on a PDCCH candidate index. One or more PDCCH candidates in the same OFDM symbol may be associated with the same TCI state. The PDCCH candidates in different OFDM symbols may be associated with a different TCI states.

In another embodiment, a WTRU may be configured with more than one TCI state for search space monitoring. For example, a WTRU may use more than one receive beam (e.g., spatial Rx QCL parameter) at the same time based on capability, and one or more TRPs may simultaneously send a PDCCH to a WTRU. Which receive beams to use may be indicated to the WTRU. For example, a WTRU may indicate its capability to support receiving multiple receive(Rx) beams simultaneously, wherein the capability may be indicated as the number of TCI states supported at the same time. For another example, a WTRU may be configured by a gNB with one or more TCI states to be used for monitoring a search space (e.g., attempting to decode one or more PDCCH candidates in a search space), wherein the one or more TCI states may be indicated via higher layer signaling (e.g., RRC and/or MAC-CE). In another example, a first TCI state may be used in a first Rx panel at a WTRU receiver to determine the Rx beam in the first panel, and a second TCI state may be used in a second Rx panel at the WTRU receiver to determine the Rx beam in the second panel.

The number of TCI states used for a search space may be determined based on a mode of operation, wherein the mode of operation may be based on the traffic type. For example, a single TCI state may be used for a search space in a first mode of operation (e.g., eMBB), and multiple TCI states may be used for a search space in a second mode of operation (e.g., URLLC).

In embodiments, a beam failure recovery (e.g., link reconfiguration) may be performed, used, or triggered when the beam quality of associated TCI states is under a threshold, wherein the threshold may be determined based on the mode of operation. A first threshold may be used for a first mode of operation (e.g., eMBB), and a second threshold may be used for a second mode of operation (e.g., URLLC). Additionally or alternatively, a beam failure recovery may be performed, used, or triggered if all TCI states for a search space (or CORESET) fail in a first mode of operation (e.g., eMBB) while the beam failure recovery may be performed, used, or triggered if any TCI state for a search space (or CORESET) fails in a second mode of operation (e.g., URLCC). A TCI state for a search space may be considered failed if the associated beam quality for the TCI state is below a threshold.

In an embodiment, a WTRU may be configured with one or more SRS resource sets, wherein each SRS resource set may be associated with a TRP. In an embodiment, the association between an SRS resource set and a TRP may be determined by which timing advance group (TAG) is used for the SRS resource set. For example, a first SRS resource set may be associated with a first TAG and a second SRS resource set may be associated with a second TAG. TA and TAG may be used interchangeably herein. When a WTRU is triggered with more than one SRS resource set, and the triggered SRS resource sets overlap in time, the WTRU may send the triggered SRS resource sets if all triggered SRS resource sets are in the same TAG. Otherwise, the WTRU may send one or more SRS resource sets in the same TAG and drop the rest of SRS resource sets. The simultaneous transmission of SRS resource sets may be based on WTRU capability.

When a WTRU is triggered with more than one SRS resource set, and the triggered SRS resource sets overlap in time, the WTRU may send the triggered SRS resource sets if the gap between timing advance values of the triggered SRS resource sets are within a threshold. The threshold value may be determined based on the numerology (e.g., subcarrier spacing, CP length, etc.). If a WTRU is triggered with more than one SRS resource set, and the triggered SRS resource sets overlap in time, the WTRU may determine which SRS resource sets to send based on the associated panel. For example, if triggered SRS resource sets are in different panels (e.g., Tx panel at the WTRU), the WTRU may send the triggered SRS resource sets. Otherwise, the WTRU may determine a single SRS resource in each panel Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of multi-transmit/receive point (multi-TRP) transmission, comprising:
   decoding a first physical downlink control channel (PDCCH) transmission from a first transmit receive point (TRP) to obtain a first parameter set indicating first timing information;
   decoding a second PDCCH transmission from a second TRP to obtain a second parameter set indicating second timing information;
   receiving a first physical downlink shared channel (PDSCH) transmission from the first TRP;
   receiving a second PDSCH transmission from the second TRP;
   for each TRP, based on each of a PDSCH reception slot location and the first timing information and the second timing information, determining a candidate PUCCH slot location;
   selecting a PUCCH slot location for the first and second TRP based on comparison of the determined candidate PUCCH slot locations, wherein the selected PUCCH slot location is a latest candidate PUCCH slot location in time; and
   transmitting a PUCCH transmission to the first and second TRP using the selected PUCCH slot location.

2. The method of claim 1, wherein on a condition that all of the determined candidate PUCCH slot locations are the same, the selected PUCCH slot location is any one of the determined candidate PUCCH slot locations.

3. The method of claim 1, wherein the PUCCH transmission comprises a selected ACK/NACK report.

4. The method of claim 1 further comprising not sending a candidate ACK/NACK report in a slot not corresponding to the selected PUCCH slot location.

5. The method of claim 1, wherein each obtained timing information respectively defines a time offset between each received PDSCH transmission and a corresponding candidate PUCCH slot location.

6. The method of claim 1, wherein the first parameter set and second parameter set each indicate a control resource set (CORESET).

7. The method of claim 1 further comprising transmitting data, other than an ACK/NACK report, in a candidate PUCCH slot not corresponding to the selected PUCCH slot location.

8. A wireless transmit/receive unit (WTRU) configured to perform a multi-transmit/receive point (multi-TRP) transmission, comprising:
   a receiver configured to:
      receive a first physical downlink shared channel (PDSCH) transmission from a first transmit receive point (TRP); and
      receive a second PDSCH transmission from a second TRP;
   a processor configured to:
      decode a first physical downlink control channel (PDCCH) transmission from the first TRP to obtain a first parameter set indicating first timing information;
      decode a second PDCCH transmission from a second TRP to obtain a second parameter set indicating second timing information;
      for each TRP, based on each of a PDSCH reception slot location and the first timing information and the second timing information, determine a candidate PUCCH slot location; and
      select a PUCCH slot location for the first and second TRP based on comparison of the determined candidate PUCCH slot locations, wherein the selected PUCCH slot location is a latest candidate PUCCH slot location in time; and;
   a transmitter to transmit a PUCCH transmission to the first and second TRP using the selected PUCCH slot location.

9. The WTRU of claim 8, wherein on a condition that all of the determined candidate PUCCH slot locations are the same, the selected PUCCH slot location is any one of the determined candidate PUCCH slot locations.

10. The WTRU of claim 8, wherein the PUCCH transmission comprises a selected ACK/NACK report.

11. The WTRU of claim 8, the processor is further configured to not send a candidate ACK/NACK report in a slot not corresponding to the selected PUCCH slot location.

12. The WTRU of claim 8, wherein each obtained timing information respectively defines a time offset between each received PDSCH transmission and a corresponding candidate PUCCH slot location.

13. The WTRU of claim 8, wherein the first parameter set and second parameter set each indicates a control resource set (CORESET).

14. The WTRU of claim 8, wherein the processor is further configured to transmit data, other than an ACK/NACK report, in a candidate PUCCH slot not corresponding to the selected PUCCH slot location.

* * * * *